Oct. 16, 1956     A. N. SZWARGULSKI     2,767,392
LEAK DETECTOR FOR PRESSURE FUEL LINES
Filed July 8, 1953
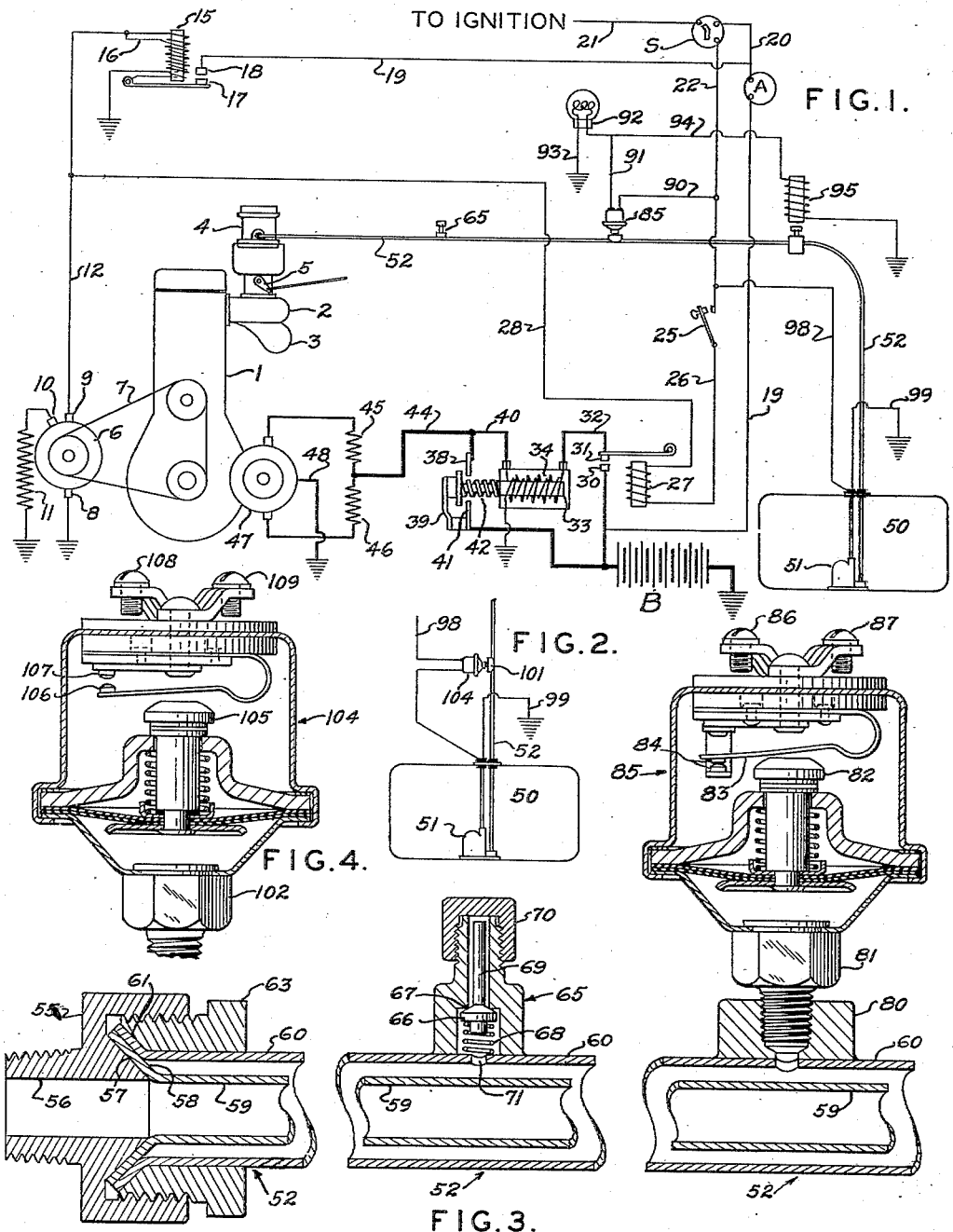
INVENTOR.
ALEX N. SZWARGULSKI
BY George R. Ericson
ATTORNEY

2,767,392

LEAK DETECTOR FOR PRESSURE FUEL LINES

Alex N. Szwargulski, St. Louis, Mo., assignor, by mesne assignments, to ACF Industries, Incorporated, New York, N. Y., a corporation of New Jersey Application July 8, 1953, Serial No. 366,846

2 Claims. (Cl. 340—242)

This invention relates to an improvement in fuel supply systems for motor vehicles which will minimize the chances of undiscovered leaks in the system, and thereby reduce the risk of fire. More specifically, this invention relates to a fuel system for a motor vehicle including an automatic safety device which will detect and indicate leakage or the possibility of leakage, or cut off flow of fuel to the leak when these conditions exist.

The danger of fire or explosion from gasoline vapors which accumulate in and around motor vehicles always exists because leaks in the fuel system are not readily detected by inspection, and may only occur during vehicle operation when inspection is not practical. Furthermore, parts of the fuel system often rupture for unexpected reasons. The present invention may be applied to parts of the fuel system where leakage or rupture is most likely to occur, such as in the fuel lines and joints, and is described in detail hereinafter as applied to the latter. It is contemplated that this invention has other applications in systems which handle or contain other fluids that are considered expensive, poisonous, or dangerous.

As illustrated herein by way of example, the invention is applicable to the fuel lines and connections in motor vehicles, and in this form it comprises a separate chamber, one wall of which is in common with the exterior wall of the fuel supply system. This chamber is adapted to contain air or other non-inflammable fluid at pressures in excess of, or less than, those which ordinarily exist in the part of the system containing or conveying the fuel. In cases where the non-inflammable fluid is maintained at pressures in excess, the chamber is provided with means whereby it may be charged with this fluid under pressure. Connected with this chamber is a pressure responsive switch which may close or open a circuit, as the case may be, in response to pressure changes in the chamber which will occur on failure of the fuel line or its connections. The circuit can be connected with indicators and valve means in the fuel system which will indicate this failure and seal off the fuel from the defective part of the system where the failure has occurred.

In one embodiment of the invention, this switch is of a type which is maintained open by the pressure within the chamber, and is connected in a circuit in series with the ignition switch and an indicator and/or a solenoid operated valve. In the system briefly described above, a failure in the fuel supply system permits the leakage of non-inflammable gases to operate the pressure-responsive switch, closing the circuit to the indicator and valve to shut off the fuel supply.

The second embodiment of this invention is similar to the one above, except that the pressure-responsive switch is of the type which is maintained closed under pressure. This switch is, in turn, connected in series in a circuit with the ignition switch, indicator and fuel pump. In this embodiment of the invention, a leak in the fuel supply system will cause a drop in pressure in the fluid chamber, opening the switch and shutting off the fuel pump.

Since the fluid chamber surrounds elements of the fuel supply system, any leakage in the fuel supply system is detected long before any fuel escapes. Thus it can be accurately stated that the present safety device anticipates the possibility of any leakage from the fuel system.

In the drawings,

Fig. 1 is a view diagrammatically illustrating the interconnection of the safety device of the present invention with the fuel supply system and electrical system of a motor vehicle.

Fig. 2 is a diagrammatic illustration of another embodiment of the invention.

Fig. 3 is a detail view of the fuel line of Fig 1.

Fig. 4 is a detail view of the pressure-operated switch of Fig. 2.

In the drawings, 1 indicates an engine having an intake manifold 2, exhaust manifold 3, and a carburetor 4 mounted on intake manifold 2. The carburetor 4 has the usual throttle control 5 which is connected to the manual control in the motor vehicle (not shown). Engine 1 drives a generator 6 through the belt connection 7. Generator 6 is of the two-brush type, with one brush 8 connected to ground and the other brush 9 connected by way of lead 12 with the battery. Generator 6 also has a field connection 10 through resistance 11 to ground. Lead 12 connects the generator with the electromagnet of a generator cut-out 15 and with one terminal 17 of the cut-out by way of lead 16 also on the electro-magnet of the cut-out 15. Terminal 18 of cut-out 15 is connected by a lead 19 through the ammeter A with the battery B and thence to ground. When the generator 6 is driven by the engine 1, cut-out 15 closes contacts 17 and 18, and current flows through leads 12 and 19 to the battery B. When the engine stops, cut-out 15 opens, breaking the circuit to the generator.

An engine ignition circuit is shown connected to the battery by way of leads 20 and 19 through the twist switch S, but, since the ignition circuit forms no part of the present invention, it is not shown or described here. Twist switch S is the type actuated by a key for opening and closing the circuit between the leads 20 and 21 to the ignition circuit, and between leads 20 and 22 to the starter motor circuit.

The starter motor circuit will now be described in detail. With twist switch S closed, lead 22 is energized from the battery to a starter switch 25. A lead 26 connects the starter switch with coil 27, and thence through lead 28 to ground through lead 12 and brushes 9 and 8 of the generator 6. This circuit prevent energization of the relay 27 when the generator is in operation. Relay 27 has a fixed terminal 30 connected directly with the battery B, and a movable terminal 31 connected by a lead 32 with the core of starter motor solenoid 33, and thence to ground. The starter solenoid has a holding winding 34 connected with one terminal 38 of starter solenoid relay 39 by the lead 40. The other terminal 41 of starter solenoid relay 39 is connected directly with the battery B. A spring 42 normally maintains the starter solenoid relay open. Terminal 38 of the relay is connected by a lead 44 with a split field 45, 46 of starter motor 47, and from thence to ground through a lead 48. The circuit within the starter motor for connecting the brushes with the battery and ground are not shown, but are of a well known and conventional construction in starter motors.

So far the description has been confined to the usual generator and starter motor circuits which are conventionally used in the motor vehicle art.

The motor vehicle is provided with the usual fuel tank 50 within which is mounted an electrically driven fuel pump 51. This fuel pump is, in turn, provided with a fuel line 52 leading from the pump 51 to the carburetor 4. This fuel line is of novel construction, and is shown in detail in Fig. 3. In Fig. 3 is shown a fuel line having a fitting 55 which can be either a male or female type and serve as a connection with either the fuel pump 51 or the carburetor 4, as the case may be. Fitting 55 has a bore 56 provided with a reversely tapered seat 57. Fuel line 52 is flared at its end as shown at 58 to seat on the portion 57 of the fitting 55. The fuel line 52 is double-walled, and the exterior tube 60 has a flared end 61 seated on the external face of the flared portion 58 of interior tube 59. The entire assembly of fitting and tubes is coupled together by a nut 63 engaging the internal threads in the fitting 55. Both ends of the fuel line 52 are provided with similar fittings. The outer tube 60 of the fuel line has integrally formed therewith an air valve 65 which is of the conventional type such as used in inner tubes for automobile tires. Valve 65 has a movable element 66 engaging a seat 67 under the spring pressure provided by 68. A stem 69 extends to the valve opening so that the valve may be manually moved from its seat. A cap 70 closes the valve against the entry of foreign matter. Exterior tube 60 is apertured at 71, so that there is communication between the chamber formed by the outer tube 60 on fuel line 59 and the inlet valve 65. This chamber may be charged with an inert gas such as carbon dioxide, or the like, through the valve 65, and the pressure will be maintained by the operation of the valve.

Outer tube 60 is also provided with a threaded fitting 80 into which is screwed a nipple 81 of a pressure operated switch generally indicated as 85. This switch is similar to that shown in my joint patent with A. C. Korte, No. 2,537,354, of January 9, 1951. In view of the fact that it is described in detail in the patent, a further description here does not appear necessary. It is sufficient to point out that the switch contains a diaphragm-operated plunger 82 which contacts one arm of a switch element 83 when the diaphragm is raised against spring pressure due to the action of pressure beneath the diaphragm. The plunger causes the contacts 84 to separate, thereby breaking the circuit between terminals 86 and 87. Loss of pressure within the chamber closes the contacts 84 to make the circuit between the terminals 86 and 87.

Returning now to Fig. 1, the fuel line 52 equipped with the valve 65 and switch 85 is shown interconnected with a circuit energized by the twist switch S. A lead 90 connects with the lead 22 to the starter motor circuit, and from the switch 85 a lead 91 extends to a lamp 92, which is grounded by way of the lead 93. The safety devices so far described would be suitable to indicate loss of pressure in the chamber between the fuel line 59, 60, which would, in turn, indicate that the fuel system had developed a leak. In order also to shut off the supply of fuel, a branch circuit 94 may be provided extending to the solenoid controlled valve 95 and from thence to ground, so that when the switch 85 closes it will not only light the lamp 92, but also energize the solenoid control valve 95 to shut off the fuel supply to the carburetor. In Fig. 1 the fuel pump 51 within the tank 50 is energized by closing the twist switch S through lead 22 and 98 to the fuel pump 51 and thence to ground through the lead 99.

This invention also contemplates the use of a second type of pressure-operated switch for controlling the fuel pump. This switch is shown in Fig. 4, and is identical to that disclosed in my joint patent with A. C. Korte, above identified.

Referring to Fig. 2, the pressure chamber on the fuel line may be provided with a threaded fitting 101 for receiving the nipple 102 of the type of pressure switch 104 illustrated in Fig. 4. Since the construction of the switch is well known in the art, it is sufficient to point out that it is of a type in which a diaphragm operates a plunger 105 in response to pressure to close a pair of terminals 106 and 107 to complete the circuit between terminals 108 and 109. Again referring to Fig. 2, when it is desired to include this additional feature above mentioned for controlling the circuit to the fuel pump 51, switch 104 is connected directly to the lead 98 so that, on failure of pressure, switch 104 will open and break the circuit through the lead 98 to the fuel pump 51. Under normal conditions, the pressure in the chamber between the tubes 59 and 60 will maintain the switch 104 closed so that, on closing of the twist switch S, the fuel pump 51 is energized to supply fuel directly to the carburetor.

*Operation*

To put the present safety device into operation, it is necessary first to charge the pressure chamber between the tubes 59 and 60 of the fuel line 52. This may be done by removing the cap 70 from the valve 65 and applying a pressure to the pressure chamber by the use of an ordinary air hose found in every service station, or by the use of a special container charged with inert gas under pressure. Once the pressure chamber has been charged, cap 70 can be replaced. As soon as the chamber between the tubes 59 and 60 is charged with air or gas under pressure, switch 85 will open and signal lamp 92 will not light. If the fuel line 52 is also provided with a solenoid control valve 95, then, so long as pressure remains in the pressure chamber, valve 95 will remain open, and switch 105 will remain closed. Thus, operation of the twist switch S and starter switch 25 will start engine 1 due to the fact that fuel under pressure is being supplied to the carburetor 4.

If a leak should develop in the inner fuel line 59, the gas in the pressure chamber will escape into the fuel line, and eventually this fact will be indicated by the closing of switch 85 to light indicator lamp 92 and close solenoid valve 95 if provided. In case the system is that shown in Fig. 2, loss of pressure will open contacts 106 and 107 and stop the fuel pump. These switches may be preset to close or open, as the case may be, when the pressure within the chamber is reduced substantially to that delivered by the fuel pump 51.

In case the entire line 52 is ruptured, the same effect on the safety device is produced. In that case, ample warning will be given either by the signal lamp or the power failure in engine 1 that the fuel line has failed. It is obvious that this safety device will not only indicate the above defects in the fuel supply system, but also any defects such as bad connections in the original installation of the fuel supply system which will allow leakage from the pressure chamber.

In the described illustration of the invention, applicant has shown a signal lamp and valve, and a power cut-off for the fuel pump, all actuated from the same source of pressure by the same or different types of switches. It is obvious that any one or combination of such devices may be used in the system.

I claim:

1. In a fluid flow system, a fluid line, a tube surrounding said fluid line and spaced therefrom to form a closed chamber around said line, a valve for admitting pressure to said closed chamber in excess of the normal pressure in said fluid line, a pressure chamber in communication with said closed chamber, an electric circuit, a switch in said circuit, means responsive to pressure in said pressure chamber to hold said switch in open position so long as the pressure in said closed chamber is above a predetermined amount, a signal light in said circuit, a cut-off valve in said fluid line, a solenoid for operating said valve, closing of the switch due to a reduction of pressure in said closed chamber causing closing of said switch to energize the signal light and to cause closing of said valve to stop the flow of fluid through said line.

2. A safety device for the fuel system of an engine driven motor vehicle having a fuel tank, an electrically driven fuel pump in said tank, a fuel line connected between said fuel pump and the engine, a source of power for said pump, an electric circuit from said source to said pump, said safety device comprising a tube surrounding said fuel line and forming therewith a closed chamber, valve means for said chamber for delivering thereto a non-inflammable fluid at a pressure in excess of that existing in the fuel line, a solenoid operable valve controlling flow of fuel through the fuel line, a signal light, an electric circuit for energizing said light and said solenoid, a switch in said last-named circuit, a chamber subject to the pressure in said closed chamber, said pressure normally operating upon said last-named switch to hold it in open position, a reduction of pressure in said closed chamber causing said switch to close to supply current to energize the signal light and to cause the solenoid to close the valve to prevent flow of fuel through the fuel line, said reduction of pressure being caused by leakage of fluid from said closed chamber into the fuel line due to leaking places in said fuel line.

References Cited in the file of this patent

UNITED STATES PATENTS

| | | |
|---|---|---|
| 2,004,769 | Shanklin | June 11, 1935 |
| 2,151,092 | Dunsheath | Mar. 21, 1939 |
| 2,326,557 | Peirce | Aug. 10, 1943 |
| 2,438,441 | Hollingsworth | Mar. 23, 1948 |
| 2,520,624 | Davey | Aug. 29, 1950 |
| 2,603,697 | Korte | July 15, 1952 |
| 2,691,773 | Lichtenberger | Oct. 12, 1954 |